Feb. 16, 1954    R. L. ANDERSON    2,669,082
GATHERING HEAD FOR COMBINES
Filed Dec. 7, 1950    3 Sheets-Sheet 1
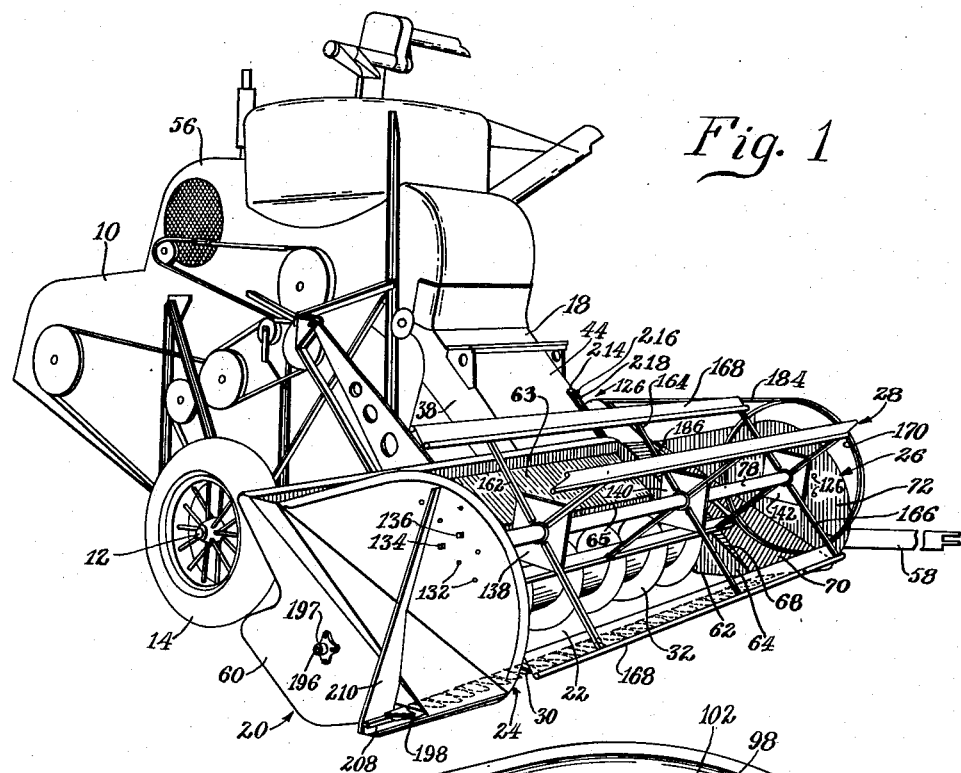
INVENTOR.
R. L. Anderson
Attorneys

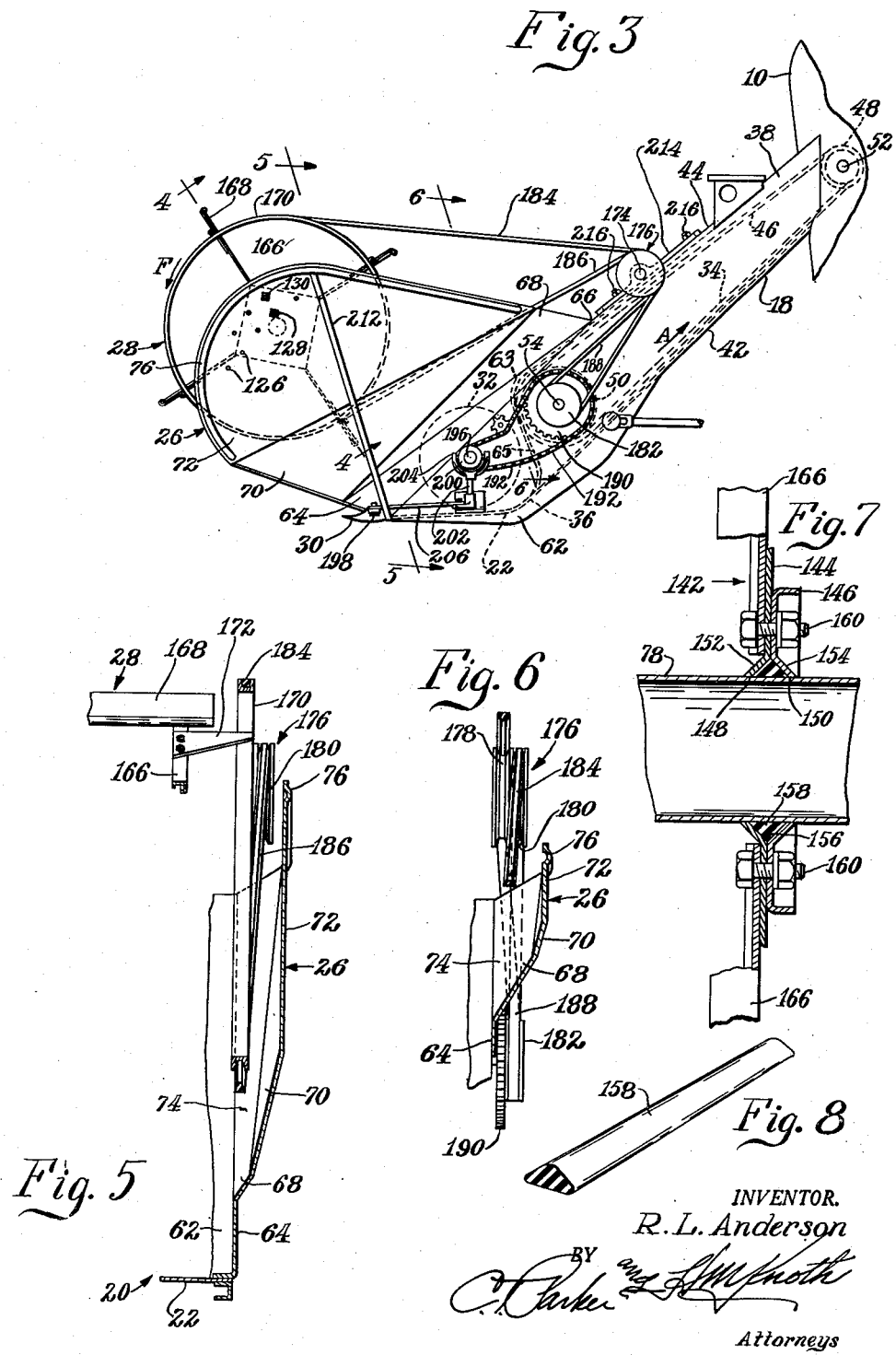

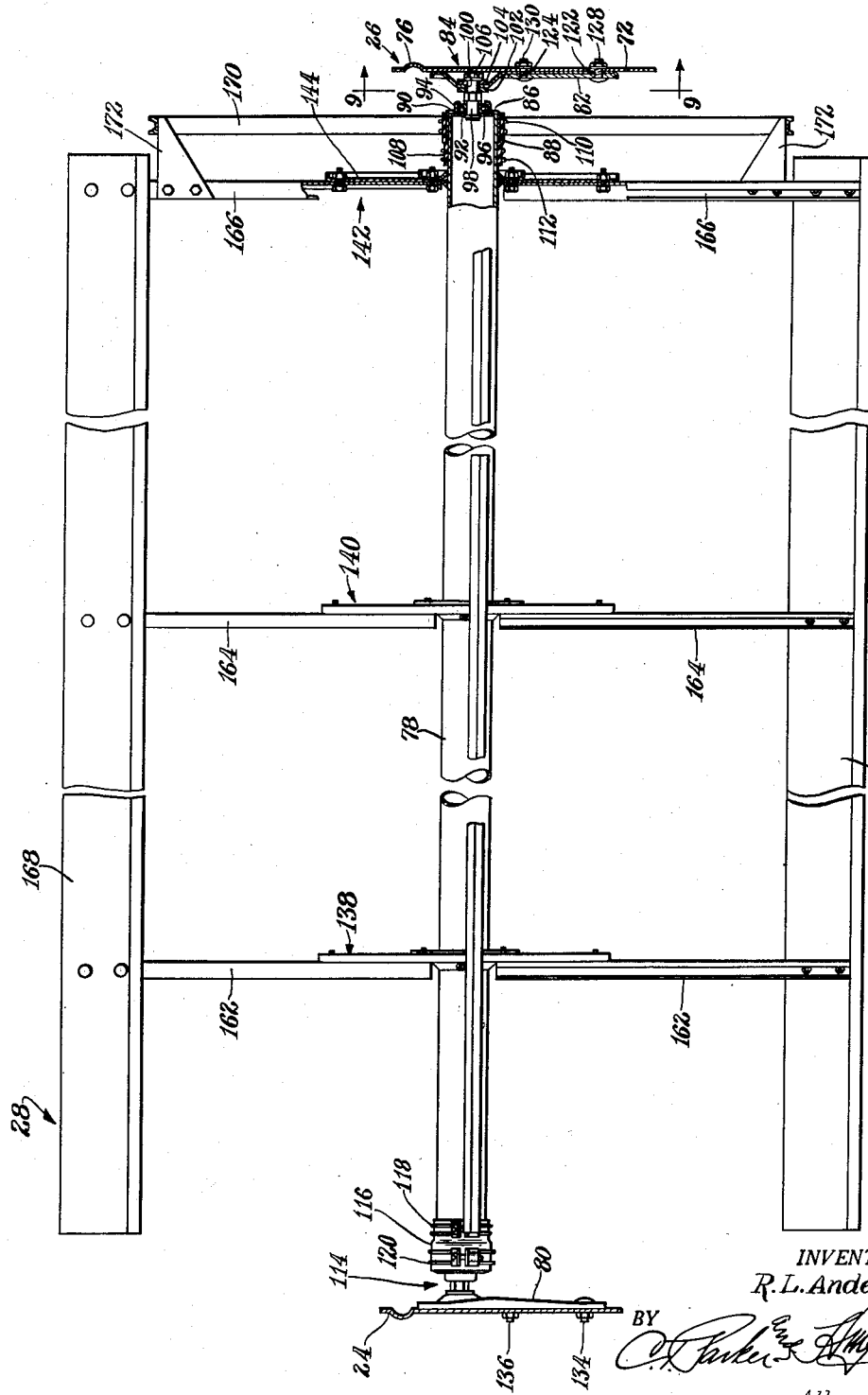

Patented Feb. 16, 1954

2,669,082

UNITED STATES PATENT OFFICE 2,669,082

GATHERING HEAD FOR COMBINES

Ralph L. Anderson, East Moline, Ill., assignor to Deere & Company, Moline, Ill., a corporation of Illinois Application December 7, 1950, Serial No. 199,683

6 Claims. (Cl. 56—185)

This invention relates to a harvester and more particularly to an improved platform and harvester reel construction.

The invention contemplates primarily improvements in harvesting machines of the combine type, in which conventional designs include a longitudinal, relatively narrow mobile body ahead of which is disposed an elongated transverse platform having means for gathering crops and for conveying the crops to a feed opening in front of a feeder house which leads to threshing and separating mechanism within the longitudinal body. According to the present invention, conventional structure and design are departed from in that the ends of the platform are provided with longitudinal upright end walls so shaped as to increase the width of the platform as measured across its upper portion, these end walls serving further as grain dividers and also as means for carrying a rotatable reel. The invention also contemplates improvements in the relationship between the reel and the platform, the design of the end wall at one end being such as to accommodate a novel driving mechanism for the reel. External portions of this end wall also provide shield structure for driving means external of the platform for driving the platform conveyor and cutting mechanism.

Still further objects of the invention relate to improved means for adjustable mounting of the reel and a novel reel construction in which the components are simply and economically constructed and assembled.

The foregoing and other important objects and desirable features inherent in and encompassed by the invention will become apparent as the disclosure of a preferred embodiment of the invention is made in the following detailed description and accompanying sheets of drawings, in which Figure 1 is a perspective view showing the forward and right-hand side of the harvester;

Figure 2 is a fragmentary perspective view taken from the rear and the left side of the harvester;

Figure 3 is a side elevational view of the forward portion of the harvester;

Figure 4 is an enlarged front view, partly in section, of the harvester reel construction, intermediate portions of the structure being broken away to shorten the view, the sectional portion of the figure being taken along the line 4—4 of Figure 3;

Figures 5 and 6 are respectively sectional views representing sections taken along the lines 5—5 and 6—6 of Figure 3.

Figure 7 is an enlarged fragmentary view with parts broken away and shown in section showing the mounting of one of the hub assemblies on the reel shaft;

Figure 8 is an enlarged fragmentary perspective view showing the preferred form of strips of compressible material utilized in securing the hub assembly to the reel shaft; and Figure 9 is an enlarged fragmentary sectional view as seen along the line 9—9 of Figure 4.

The harvester will first be described generally and briefly for the purposes of orientation. It comprises a longitudinal body 10 carried between its front and rear ends on a transverse axle 12 on which are journaled right- and left-hand wheels 14 and 16. Reference to the machine as having right- and left-hand sides is made here with respect to the position of an observer standing behind the machine and looking forwardly.

The forward part of the body 10 is in the form of a rearwardly and upwardly inclined feeder house 18 communicating at its forward end with one side of an elongated transverse platform designated generally by the numeral 20. This platform has a floor 22 and right- and left-hand end walls 24 and 26 between which is journaled a rotatable reel 28 which operates in conjunction with a conventional cutter bar 30 for harvesting grain and for moving the grain rearwardly to the floor 22. This floor serves as part of a trough in which operates a conveyor in the form of an auger 32. Since the platform 20 is considerably wider than the feeder house 18, the auger 32 serves to move grain lengthwise from right to left on the platform to the feeder house for ultimate transfer of the grain upwardly and rearwardly through the feeder house via a conveyor 34 to threshing and separating mechanism contained within the body 10. Such mechanism has not been shown, since it is not material to the present invention. Reference is made thereto merely for the purpose of completing the explanation of the functional characteristics of the machine as a whole.

As best suggested in Figure 3, the floor 22 of the platform 20 is shaped, as at 36, to form a trough in which the auger 32 operates. This trough is at its left-hand end in communication with the forward end of the feeder house 18 and the conveyor 34 operates in this zone to take grain from the auger 32 and to convey it rearwardly to the threshing mechanism (not shown) in the body 10. The feeder house has opposite side walls 38 and 40, a floor 42 and a top 44. The conveyor 34 comprises an endless belt 46 trained about an upper roller 48 and a lower roller 50, the lower run of the belt operating in the direction of the arrow A in Figure 3 to convey grain upwardly over the feeder house inclined floor 42. The rollers 48 and 50 are carried respectively on shafts 52 and 54. For present purposes, the shaft 52 may be considered an input shaft that derives power from any suitable source, such as an internal combustion engine (not shown) contained within a housing portion 56 of the body 10.

The machine shown here is of the type adapted to be drawn by a tractor and for that purpose is equipped with a forwardly extending draft tongue 58. The several features disclosed herein, however, are useful in other types of harvesters such as those of the self-propelled type.

The platform 20 is delineated at opposite ends by right- and left-hand end portions 60 and 62. From these respectively rise the end walls 24 and 26. Each of these end walls is of novel design and has special characteristics in relation to other components of the harvesting mechanism, as will be described in detail below. The platform has a rear wall made up of adjoining and angularly related transverse portions 63 and 65, the latter continuing downwardly and forwardly into the trough 36.

The end wall 26 (Figures 2, 3, 5 and 6) has a lower portion 64 that is arranged in a longitudinal upright plane. As seen in Figure 3, the portion 64 is in the form of an elongated triangle tapering upwardly to a junction at 66 with the top edge of the feeder house side wall 40. The end wall 26 is of sheet metal construction, preferably formed in one piece. This wall is shaped so that it has a second triangular portion 68 that inclines upwardly and outwardly from its junction with the lower portion 64. In other words, the portion 68 is offset outwardly relative to the portion 64. The wall continues upwardly and slightly outwardly as a third triangular portion 70, thus completing the offset relative to the portion 64. The wall then continues straight upwardly as an upper portion 72. As best seen in Figures 5 and 6, the offset between the portions 64 and 72 provides a rearwardly and upwardly inclined trough 74. The forward edge of the wall portion 72 is arcuate (Figure 3) and is beaded at 76 to add rigidity. As best seen in Figure 3, the trough 74 runs generally along the line of the top edge of the left-hand wall 40 of the feeder house 18. The purpose of this arrangement will be brought out presently.

The opposite end wall 24 is constructed symmetrically as respects the wall 26. Since the components of the wall 24 substantially duplicate those of the wall 26, detailed description of the former may be omitted. Because of the laterally outwardly directed offset in the upper portions of the walls 24 and 26, the dimension between these walls is considerably greater than that between the end portions 60 and 62 of the platform. This enables the use of a reel of commensurate width to operate efficiently over the cutter bar assembly 30. According to the present invention, the reel is journaled at opposite ends between the end walls, rather than on additional supports such as have heretofore been known. Further, the end walls 24 and 26 are imperforate (with exceptions to be hereinafter noted) and because of their arcuate shape serve as dividers without the necessity of additional dividers such as those conventionally provided.

The reel construction is best shown in Figure 4, wherein it will be seen that the reel comprises a central tubular shaft or pipe 78 journaled at opposite ends by means of brackets 80 and 82. Since the construction at opposite ends is identical, only the left-hand bracket will be described. The brackets are mounted respectively on the inner faces of the end walls 24 and 26.

The mounting of the left-hand end of the reel shaft 78 on the bracket 82 is accomplished by means of a bearing assembly 84 comprising a cup-shaped cap 86 having an external annular flange 88 closely fitted over the end of the reel shaft 78. The cap further has a radial flange 90 in which is formed a circular aperture 92 coaxial with the reel shaft 78. Integral with the radial flange 90 is a circular or annular flange 94 which surrounds the aperture 92 and in which is carried an anti-friction bearing 96. This bearing carries a stub shaft 98 that is coaxial with the reel shaft 78. An upper portion of the bracket 82 is apertured at 100 to receive the outer end of the stub shaft 98. The stub shaft is rigidly secured to the bracket 82 by means of inner and outer washers 102 and 104 and a nut 106. The cap 86 is secured to the end of the reel shaft 78 by a sleeve 108 of flexible, torsionally yieldable material, preferably comprising a short length of fabric-impregnated rubber hose stock. The length of the sleeve slightly exceeds that of the flange 88 on the cap 86, so that the sleeve surrounds this flange and also surrounds an adjacent portion of the reel shaft 78. The connection is completed by a pair of embracing or circular clamps 110 and 112. The clamp 110 embraces that portion of the sleeve 108 that surrounds the annular flange 88 and the other clamp embraces that portion of the sleeve that surrounds the adjacent portion of the reel shaft 78.

The opposite end of the reel shaft 78 is carried in a similar manner, a bearing assembly 114 being connected to this end of the reel shaft by a flexible sleeve 116 and a pair of clamps 118 and 120. The connections at 108 and 116 provide not only simple connections but also establish means permitting limited relative angular movement between the reel shaft and end cap.

The construction of the bracket 82 may be seen best in Figure 9. This bracket has a pair of apertures 122 and 124, the latter being in the form of an arcuate slot formed about the former as a center. The upper portion 72 of the end wall 26 is provided with a plurality of openings 126. These openings are arranged in vertical rows and the openings in each row are spaced apart vertically on the order of the spacing between the aperture 122 and the slot 124 in the bracket 82. The fore-and-aft spacing between adjacent rows of openings is determined on the basis of the altitude of an equilateral triangle including a pair of openings in one row and the proximate opening in an adjacent row. Stated otherwise, the openings in one row are vertically staggered relative to those in an adjacent row so that the aforesaid results will obtain. This arrangement may be better understood by considering three openings identified by C, D and E in Figure 9. The openings C and D are adjacent in one row and the vertically staggered opening E is the closest opening in an adjacent row. The distance C—D is equal to the distance C—E or D—E.

In the mounting of the bracket 82 on the end wall 26, any selected pair of openings may be utilized for pivoting the bracket 82 in one opening by a bolt 128 passed through that opening and the aperture 122 in the bracket and a second bolt 130 passed through an adjacent opening and through the slot 124 in the bracket. Not only may the bracket have different positions on the end wall 26, but it may be adjusted within the limits of the slot 124 while in such position. The opposite end wall 24 is similarly constructed, a plurality of openings 132 being visible in Figure 1, as are a pair of bolts 134 and 136 for securing the bracket 80 to that end wall.

A further feature of the reel construction involves the mounting of a plurality of hub assemblies 138, 140 and 142 on the reel shaft 78. Since all of these assemblies are identical, only the assembly 142 will be described.

This assembly comprises a pair of plates 144 and 146 centrally apertured respectively at 148 and 150 so that the reel shaft or pipe 78 may be passed therethrough. The aperture 148 in the plate 144 is surrounded by a bell mouth portion 152, and a similar bell mouth portion 154 is provided on the plate 146 about the aperture 150. When the two plates are assembled as in Figure 7, the opposing bell mouths form an annular channel 156 within which is deformed a band or ring of resilient deformable material, which may initially be in the form of a strip 158 of rubber or the like. The section of the strip 158 is slightly larger than that of the channel 156, so that when the plates are drawn together, as by a plurality of bolts 160, the material of the strip 158 is compressed, forming a resilient or yieldable union between the reel pipe 78 and the plates 144 and 146. The drive connection thus established is sufficient in normal operation to effect rotation of the hub assembly 142 with the reel pipe or shaft 78. The same construction is carried out in the hub assemblies 138 and 140, and the same functional characteristics follow.

The hub assembly 138 carries a plurality of radially outwardly extending spokes 162. The hub assemblies 140 and 142 are provided respectively with similar spokes 164 and 166. The outer ends of the spokes support a plurality of bats 168 that parallel the reel shaft 78. The reel is, at least in appearance, of conventional design.

It is a characteristic of the reel construction forming a part of this invention that it is driven in a unique manner. Part of this construction includes a relatively large sheave ring 170 that is coaxial with but structurally independent of the reel shaft 78. This sheave ring is provided at angularly spaced points on the order of the angular spacing of the spokes 166 with mounting means in the form of brackets 172 by means of which the ring is fixed to the spokes 166. As best shown in Figure 5, the sheave ring 170 is closely proximate to the inner face of the end wall 26. As a matter of fact, the sheave ring is disposed substantially in the longitudinal upright plane of the groove 74. At the same time, the ring is laterally outwardly of and above the end portion 62 of the platform 20. This construction enables the proper and most desirable location of the sheave ring without extending the reel shaft through the end wall.

As best seen in Figure 3, the feeder house 18 carries just rearwardly of the junction of the end wall 26 and the feeder house a transverse shaft 174 on which is keyed a double sheave 176. This sheave comprises first and second annular grooves 178 and 180 (Figures 5 and 6). The groove 178 is in fore-and-aft alinement with the sheave ring 170 and is therefore rearwardly of and in alinement with the trough 74. The outer groove 180 is rearwardly of the trough 74 and is in vertical alinement with a third sheave 182 on the shaft 54 for the lower end of the feeder house conveyor 34. This third sheave is outside the side wall 40 of the feeder house and is likewise outside of the end wall 26. Stated otherwise, the sheave 182 is rearwardly of and below the trough or offset portion 74. An endless belt 184 is trained about the sheave ring 170, over the double sheave 176, and about the sheave 182. The direction of rotation of the reel 28 is indicated in Figure 3 by the arrow F. The lower run of the belt 184, designated at 186, that extends between the bottom of the sheave ring 170 and the top of the outer groove 180 of the double sheave 176 generally parallels or follows the offset or groove 74. The run 186 continues about the groove 180 and constitutes an upper run 188 between the sheave groove 180 and the sheave 182. The belt returns from the sheave 182 to the sheave ring 170 via the inner sheave groove 178 of the double sheave 176. Thus, the direction of movement of the conveyor 34 as indicated by the arrow A is consonant with the rotation of the reel 28 as indicated by the arrow F.

In view of the offset at 74 in the end wall 26, the end wall is shaped in such manner as to serve substantially as a shield for the driving mechanism outside the end wall 26 and feeder house side wall 40, at least to the extent that the belt portions between the sheaves 176 and 182 may be said to be protected from the front by the offset in the end wall 26. Other portions of the driving mechanism may be said to be similarly protected by this offset. In addition to the sheave 182, the shaft 54 has fixed thereto outside the feeder house left-hand side wall 40, a sprocket 190 about which is trained a driving chain 192. This chain is also trained about a smaller sprocket 194 (Figure 2) keyed to the outer end of a shaft 196 on which the platform auger 32 is carried. The opposite end of the auger shaft is visible in Figure 1, wherein there is also visible at 197 a bearing in the end portion 60 of the platform for carrying this end of the auger shaft. A similar bearing, not visible, is provided at the left-hand end of the platform. As best seen in Figure 6, the sprocket 190 is located behind and below the outside of the offset or trough 74 of the end wall 26.

The auger shaft 196 at the left-hand end of the platform and outside the end wall 26 has means for driving a knife 198 for the cutter bar 30. The specific driving means is not material here. That shown is of the type illustrated in the patent to Paradise 2,297,317. Briefly, the mechanism includes a circular wobble member 200 for oscillating a shaft 202 by means of a yoke 204. An arm 206 connected to the bottom of the shaft 202 effects reciprocation of the knife 198.

The cutter bar assembly 30, as is conventional, may include a rigid bar, here in the form of an angle 208 which projects at opposite ends beyond the end walls 24 and 26. Braces 210 and 212 are provided respectively at the right- and left-hand ends of the platform for bracing the end walls 24 and 26.

Inasmuch as adjusting of the position of the reel 28 by means of the brackets 80 and 82 will affect the length of the belt 184, provision is made for adjusting the double sheave 176. For this purpose, the shaft 174 is carried in a bracket and bearing member 214 secured by bolts 216 to the top 44 of the feeder house 18. The bracket has a longitudinal slot 218 (Figure 1) for permitting the necessary adjustment of the bracket relative to the feeder house to accommodate changes in length of the belt 184.

For the purposes of clarification of the disclosure, attention should be directed to the fact that the mounting for the reel shown in Figures 4 and 9 includes the parts in positions different from those appearing in Figures 1 and 2. This will illustrate the versatility of the mounting means for carrying the reel in any one of several positions.

Various features of the invention not specifically enumerated herein will undoubtedly occur to those versed in the art, as likewise will numerous modifications and alterations in the preferred embodiment of the invention disclosed, all of which may be accomplished without departing from the spirit and scope of the invention as defined in the appended claims.

What is claimed is:

1. In a harvester having a longitudinal body, harvesting mechanism comprising: a platform floor disposed ahead of and across the front end of the body; a conveyor housing extending rearwardly from the platform to the body and having an upright, longitudinal side wall adjoining the floor; said side wall having an upwardly and rearwardly inclined top edge; an upright, longitudinal end wall fixed to the floor and having a lower portion in the plane of said side wall and a laterally outwardly offset upper portion outside said plane, said upper and lower portions being joined along an offset portion forming a forwardly and downwardly extending continuation of said side wall top edge; a harvester reel above the floor and closely inwardly of said end wall and carried by said end wall for rotation about a transverse horizontal axis above the offset between said upper and lower end wall portions; a relatively large sheave on the reel closely proximate to and inwardly of said upper portion of the end wall and above and vertically alined with said offset; a double sheave rotatably carried by the conveyor housing at a portion of said side wall top edge rearwardly of said end wall and including first and second parallel grooves in upright, longitudinal planes respectively inwardly and outwardly of said offset portion; a third sheave below the double sheave and located outside said side wall and rearwardly of said offset portion of the end wall and outside said end wall so that said offset portion inclines rearwardly over said single sheave and separates the reel sheave from said third sheave; and an endless belt trained about the reel and third sheaves and looped over the double sheave so that the belt between the double sheave and the reel sheave is inside the end wall and above and ahead of said offset portion and the belt between said double sheave and the third sheave is outside the end wall and below and behind said offset portion.

2. The invention defined in claim 1, in which: conveying means is carried by the platform and includes a drive member projecting outwardly through the end wall below and behind said offset portion; and a drive connection is effected between said third sheave and said drive member outside said end wall and below and behind said offset portion.

3. In a harvester having a longitudinal body, harvesting mechanism comprising: a platform floor disposed ahead of and transversely to the body and including transversely spaced apart opposite end portions and an upright rear wall; a pair of longitudinal, upright end walls fixed respectively to the floor end portions and joined to and extending forwardly from the rear wall; each end wall having a lower portion extending upwardly and then outwardly and an adjoining upper portion continuing upwardly to an upper edge generally at the level of the top of the rear wall, said lower and upper portions adjoining to form a trough that is laterally outwardly of the proximate end portion of the platform floor and that inclines rearwardly and upwardly from a lower forward end relatively close to the platform floor to a rear upper end leading over the top of said rear wall; a harvester reel carried at its opposite ends by the end wall upper portions above and parallel to the platform floor for rotation about an axis above said trough, said reel having at one end thereof and closely inwardly of the proximate end wall a coaxial, relatively large circular sheave in vertical alinement with the trough of such diameter as to closely clear the forward end of the trough; a double sheave rotatably supported rearwardly of the rear wall and in fore-and-aft alinement with the rear end of said trough; a third sheave rotatably supported rearwardly and outside of said trough; and an endless belt trained about the large sheave, over the double sheave and about the third sheave, with the lower run thereof between the bottom of the large sheave and the top of the double sheave running upwardly and rearwardly in said trough.

4. In a harvester having a longitudinal body, harvesting mechanism comprising: a platform floor disposed ahead of and transversely to the body and including transversely spaced apart opposite end portions and an upright rear wall; a pair of longitudinal, upright end walls fixed respectively to the floor end portions and joined to and extending forwardly from the rear wall; each end wall having a lower portion extending upwardly and then outwardly and an adjoining upper portion continuing upwardly to an upper edge generally at the level of the top of the rear wall, said lower and upper portions adjoining to form a trough that is laterally outwardly of the proximate end portion of the platform floor and that inclines rearwardly and upwardly from a lower forward end relatively close to the platform floor to a rear upper end leading over the top of said rear wall; a harvester reel carried at its opposite ends by the end wall upper portions above and parallel to the platform floor for rotation about an axis above said trough, said reel having at one end thereof and closely inwardly of the proximate end wall a coaxial relatively large circular sheave in vertical alinement with the trough of such diameter as to closely clear the forward end of the trough; a smaller sheave rotatably supported rearwardly of the rear wall and in fore-and-aft alinement with the rear end of said trough; and an endless belt trained about the large sheave and over the smaller sheave, with the lower run thereof running upwardly and rearwardly in said trough.

5. In a harvester having a longitudinal body, harvesting mechanism comprising: a platform floor disposed ahead of and across the front end of the body; a conveyor housing extending rearwardly from the platform to the body and having an upright, longitudinal side wall adjoining the floor; an upright, longitudinal end wall fixed to the floor, including a lower portion adjoining the floor and lying in the plane of the side wall and an upper portion adjoining said lower portion above the floor and offset laterally outwardly of said lower portion to lie outside of and parallel to said plane; a harvester reel above the floor and closely inwardly of said end wall and carried by said end wall for rotation about a transverse horizontal axis above the offset between said upper and lower end wall portions; a relatively large sheave on the reel closely proximate to and inwardly of said upper portion of the end wall and above and vertically alined with said offset; a relatively smaller sheave rotatably carried by the conveyor housing outside the plane of said side wall and rearwardly of said end wall and behind and in fore-and-aft alinement with said offset; and an endless belt trained over said sheaves, with the lower run thereof inwardly of said upper portion of the end and above said offset.

6. In a harvester having a longitudinal body, harvesting mechanism comprising: a platform floor disposed ahead of and across the front end of the body; a conveyor housing extending rearwardly from the platform to the body and having an upright, longitudinal side wall adjoining the floor; said side wall having an upwardly and rearwardly inclined top edge; an upright, longitudinal end wall fixed to the floor and having a lower portion in the plane of said side wall and a laterally outwardly offset upper portion outside said plane, said upper and lower portions being joined along an offset portion forming a forwardly and downwardly extending continuation of said side wall top edge; a harvester reel above the floor and closely inwardly of said end wall and carried by said end wall for rotation about a transverse horizontal axis above the offset between said upper and lower end wall portions; a relatively large sheave on the reel closely proximate to and inwardly of said upper portion of the end wall and above and vertically alined with said offset; a relatively smaller sheave rotatably carried by the conveyor housing at a portion of the top edge of said side wall rearwardly of the end wall and outside the plane of said side wall and in fore-and-aft alinement with the offset; and an endless belt trained about said sheaves, with the lower run thereof inclining upwardly and rearwardly from the bottom of the large sheave and following along the inside and above said offset portion to the smaller sheave.

RALPH L. ANDERSON.

References Cited in the file of this patent

UNITED STATES PATENTS

| Number | Name | Date |
|---|---|---|
| 464,795 | Dodge | Dec. 8, 1891 |
| 732,994 | Appleby | July 7, 1903 |
| 972,321 | Beckett et al. | Oct. 11, 1910 |
| 1,328,983 | Coates | Jan. 27, 1920 |
| 1,411,433 | Higgins | Apr. 4, 1922 |
| 1,871,861 | Rossman | Aug. 16, 1932 |
| 2,071,627 | Hawn | Feb. 23, 1937 |
| 2,106,737 | Haire | Feb. 1, 1938 |
| 2,345,847 | Wink | Apr. 4, 1944 |
| 2,395,672 | Kranick et al. | Feb. 26, 1946 |
| 2,417,467 | Bryant, Jr. | Mar. 18, 1947 |
| 2,470,704 | Korsmo et al. | May 17, 1949 |
| 2,554,195 | Jones | May 22, 1951 |